(12) United States Patent
Porfiri et al.

(10) Patent No.: US 11,271,985 B2
(45) Date of Patent: Mar. 8, 2022

(54) METHOD AND NETWORK NODE FOR HANDLING SCTP PACKETS

(71) Applicant: Telefonaktiebolaget LM Ericsson (publ), Stockholm (SE)

(72) Inventors: Claudio Porfiri, Stockholm (SE); Carlo Vitucci, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 327 days.

(21) Appl. No.: 16/306,149

(22) PCT Filed: Jun. 2, 2016

(86) PCT No.: PCT/SE2016/050526
§ 371 (c)(1),
(2) Date: Nov. 30, 2018

(87) PCT Pub. No.: WO2017/209669
PCT Pub. Date: Dec. 7, 2017

(65) Prior Publication Data
US 2020/0329090 A1    Oct. 15, 2020

(51) Int. Cl.
*H04L 29/06* (2006.01)
*H04L 12/823* (2013.01)
(Continued)

(52) U.S. Cl.
CPC ............ *H04L 65/608* (2013.01); *H04L 47/32* (2013.01); *H04L 65/80* (2013.01); *H04L 69/162* (2013.01)

(58) Field of Classification Search
CPC ....... H04L 65/608; H04L 47/32; H04L 65/80; H04L 69/162
See application file for complete search history.

(56) References Cited

U.S. PATENT DOCUMENTS 6,658,477 B1 * 12/2003 Lisitsa ................ G06F 8/45
709/231
6,766,407 B1 *  7/2004 Lisitsa ............ H04L 29/06027
709/241
(Continued)

FOREIGN PATENT DOCUMENTS

CN    101060469 A    10/2007
CN    101146100 A     3/2008
(Continued)

OTHER PUBLICATIONS

Wadhwa, Deepak, "SCTP Fast Path Optimization for 3G/LTE Networks", White Paper Radisys, Sep. 2011, 7 pages.
(Continued)

*Primary Examiner* — Patrice L Winder
*Assistant Examiner* — Angela M Widhalm De Rodrig
(74) *Attorney, Agent, or Firm* — NDWE LLP (57) ABSTRACT

A method and a network node for handling SCTP packets are disclosed. The network node provides a control instance of a control procedure for handling administrative chunks of the SCTP packets and at least one data instance of a data procedure for handling association specific chunks of the SCTP packets. With the control instance, the network node discards association specific chunks of a received SCTP packet, and processes administrative chunks of the received SCTP packet. With each of the at least one data instance, the network node discards administrative chunks and a first set of association specific chunks of the received SCTP packet, and processes a second set of association specific chunks of the received SCTP packet, wherein the second set of association specific chunks relates the respective set of said at least one association.

18 Claims, 6 Drawing Sheets

(51) Int. Cl.
  *H04L 65/65*      (2022.01)
  *H04L 47/32*      (2022.01)
  *H04L 65/80*      (2022.01)
  *H04L 69/16*      (2022.01)

(56) References Cited

U.S. PATENT DOCUMENTS

| | | | | |
|---|---|---|---|---|
| 7,174,393 | B2* | 2/2007 | Boucher | H04L 29/06 709/250 |
| 8,200,838 | B2* | 6/2012 | Ludwig | H04L 1/1858 709/232 |
| 9,118,521 | B2* | 8/2015 | Bruss | H04L 29/06027 |
| 9,521,439 | B1* | 12/2016 | Hsu | H04L 67/02 |
| 2002/0181450 | A1* | 12/2002 | Sokol | H04L 12/4633 370/364 |
| 2006/0018301 | A1* | 1/2006 | Schrufer | H04L 69/10 370/351 |
| 2006/0164974 | A1* | 7/2006 | Ramalho | H04L 29/06027 370/219 |
| 2006/0193295 | A1* | 8/2006 | White | H04L 12/5692 370/336 |
| 2007/0002822 | A1* | 1/2007 | Huang | H04L 29/12009 370/349 |
| 2007/0005787 | A1* | 1/2007 | Igarashi | H04L 69/163 709/230 |
| 2008/0101357 | A1 | 5/2008 | Iovanna et al. | |
| 2009/0109933 | A1* | 4/2009 | Murasawa | H04L 63/029 370/335 |
| 2009/0110003 | A1* | 4/2009 | Julien | H04L 69/166 370/476 |
| 2009/0198836 | A1* | 8/2009 | Wittenschlaeger | G06F 15/16 709/253 |
| 2009/0207855 | A1* | 8/2009 | Watanabe | H04L 69/326 370/466 |
| 2011/0310901 | A1* | 12/2011 | Uchida | H04L 43/026 370/392 |
| 2012/0020375 | A1 | 1/2012 | Haruna | |
| 2012/0147776 | A1* | 6/2012 | McNair | H04L 43/04 370/252 |
| 2012/0240185 | A1* | 9/2012 | Kapoor | H04L 41/0866 726/1 |
| 2013/0041872 | A1* | 2/2013 | Aizman | G06F 16/182 707/690 |
| 2015/0109995 | A1* | 4/2015 | Mathai | H04W 8/08 370/328 |
| 2015/0382240 | A1* | 12/2015 | Hecht | H04L 69/18 370/316 |
| 2016/0218794 | A1* | 7/2016 | Matsumoto | H04L 1/1685 |
| 2017/0346933 | A1* | 11/2017 | Pope | H04L 1/0061 |
| 2018/0041934 | A1* | 2/2018 | Agarwal | H04W 36/14 |
| 2018/0225230 | A1* | 8/2018 | Litichever | G06F 21/82 |

FOREIGN PATENT DOCUMENTS

| | | | | |
|---|---|---|---|---|
| CN | 100411423 | C * | 8/2008 | H04L 65/80 |
| CN | 101262437 | A | 9/2008 | |
| CN | 105557018 | A * | 5/2016 | H04W 76/00 |
| EP | 2093975 | A1 | 8/2009 | |
| EP | 2449731 | B1 * | 6/2016 | H04L 63/101 |
| JP | 2015177261 | A * | 10/2015 | H04L 43/04 |
| JP | 2020162157 | A * | 10/2020 | H04L 69/322 |
| WO | WO-0205494 | A1 * | 1/2002 | H04L 45/60 |
| WO | 2006/069605 | A1 | 7/2006 | |
| WO | 2017209669 | A1 | 12/2017 | |

OTHER PUBLICATIONS

Stewart, R., "Stream Control Transmission Protocol", Network Working Group, Sep. 2007, 152 pages.
PCT/SE2016/050526, ISA/WO dated Jan. 24, 2017, 9 pages.
International Preliminary Report on Patentability, PCT App. No. PCT/SE2016/050526, dated Dec. 13, 2018, 8 pages.
Supplementary Search Report for CN App. No. 201680086329.1, dated May 28, 2021, 1 page.
Grant for CN App. No. 201680086329.1, dated Jun. 8, 2021, 3 pages.
Communication pursuant to Article 94(3) EPC for EP App. No. 16729400.8, dated Jun. 8, 2021, 6 pages.

* cited by examiner

METHOD AND NETWORK NODE FOR HANDLING SCTP PACKETS

CROSS-REFERENCE TO RELATED APPLICATION

This application is the National Stage of, and therefore claims the benefit of, International Application No. PCT/SE2016/050526 filed on Jun. 2, 2016, entitled "METHODS AND NETWORK NODE FOR HANDLING SCTP PACKETS." The above-referenced application is commonly assigned with this National Stage application and is incorporated herein by reference in its entirety.

TECHNICAL FIELD

Embodiments herein relate to computer networks, such as a Stream Control Transmission Protocol (SCTP) computer network. In particular, a method and a network node for handling SCTP packets are disclosed. A corresponding computer program and a carrier therefor are also disclosed.

BACKGROUND

In computer networks, a protocol known as Stream Control Transport Protocol (SCTP) provides resilience towards network failures by having the capability to select between several Internet Protocol (IP) paths for an association, e.g. a communication link or the like, between two nodes, aka End-Points (EP). This means that SCTP is a layer on top of an IP layer. A further layer on top of the SCTP layer is often referred to as a SCTP user layer, or SCTP User Application. See e.g. Request For Comments (RFC) 4960, Internet Engineering Task Force (IETF).

The association is used by SCTP for transmission of information between the two nodes. A function for selection between several IP paths is typically referred to as multihoming. The Association is a peer-to-peer connection that allows multiple streams, e.g. on several IP paths. The IP paths can be routed different routes through a network. Thus, if one path is congested, SCTP may switch to another path in order to enable continued traffic on the association handled by SCTP. This means that the association can exploit more than a single path in the network in order to achieve robustness and reliability. However, by definition, there can be only one association between two SCTP Endpoints.

Figure 1:
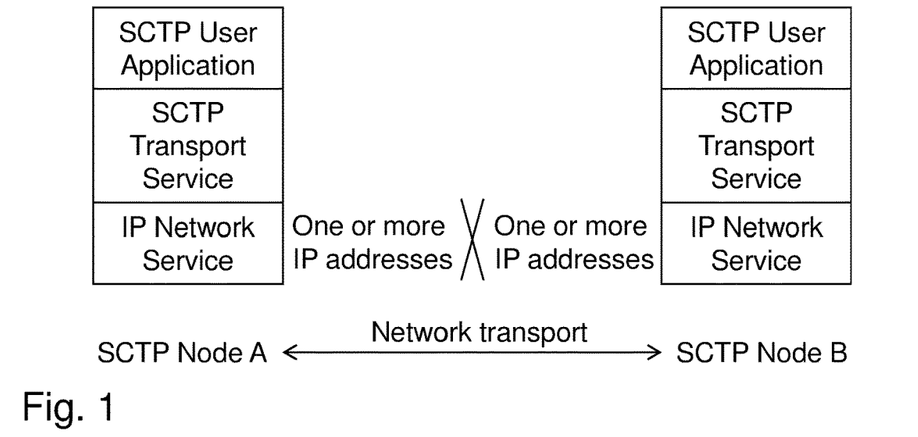
FIG. 1 is a block diagram illustrating services in known SCTP nodes.

FIG. 1 illustrates two SCTP nodes A, B connected by a network transport connection, i.e. an association. Each SCTP node A,B includes a respective SCTP User Application on top of a respective SCTP Transport service, which in its turn is on top of a IP Network service. In this example, the terms "service" and "application" are use in the same way as the term "layer" above. As seen in FIG. 1, the association may make use of one or more IP addresses.

With SCTP, data are transferred between the nodes by adopting a chunk paradigm. The chunk paradigm means that an SCTP packet includes one or more chunks. The chunk is an information unit within an SCTP packet. The chunk may transport data information or control information for protocol handling.

Figure 2:
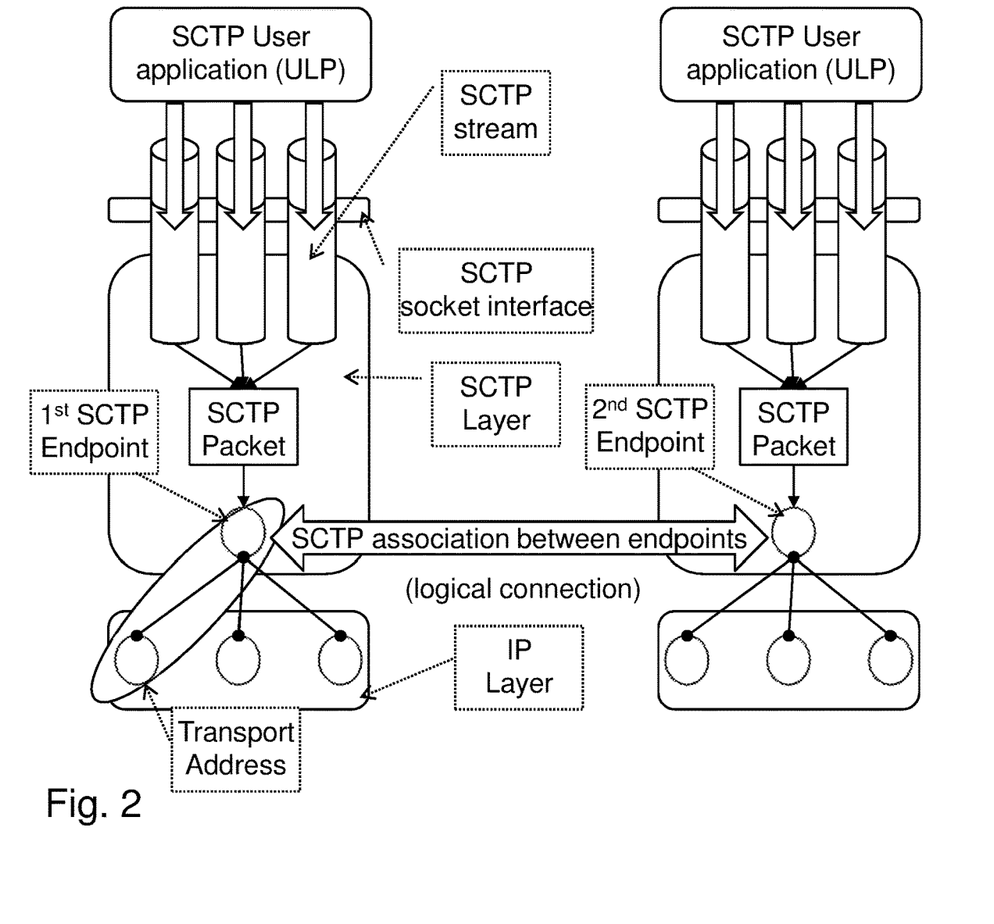
FIG. 2 is a more detailed overview illustrating a known SCTP implementation.

Now in more detail, an SCTP association between a first and a second SCTP EP is illustrated with reference to FIG. 2. The first and second EPs receive SCTP packets via one or more SCTP packet flows from a SCTP User Application. In order to send the SCTP packets to the first EP or to the second EP, the SCTP packets are sent over an IP layer.

As is well known, computers and computer systems capable of parallel processing are becoming more and more widespread. In particular, so called multi-core computer systems comprises one or more processing cores in one processing chip on a motherboard of a computer.

Figure 3:
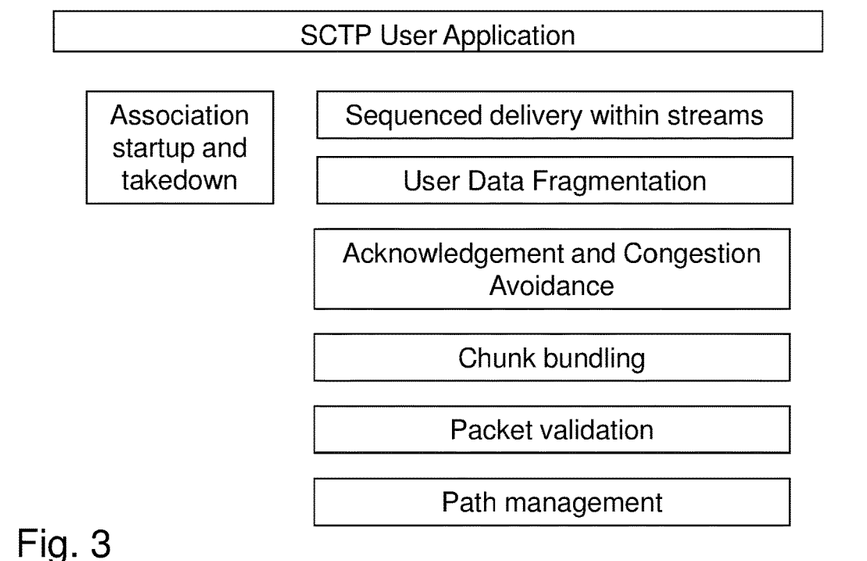
FIG. 3 is a further block diagram illustrating a known SCTP implementation.

As illustrated in FIG. 3 and described in aforementioned RFC4960, SCTP includes functions for handling Association startup and takedown, Sequenced delivery within streams, User Data Fragmentation, Acknowledgement and Congestion Avoidance, Chunk bundling, Packet validation, and Path management. However, in a known implementation of SCTP, all these functions are performed in a single-thread of the implementation. Disadvantageously, performance and capacity of a single core limits throughput achieved by the implementation.

In a further known implementation of SCTP, it is possible to scale up within an SCTP Endpoint, for instance by dedicating independent resources to each Association. With this know implementation, a SCTP Host that needs to handle a large number of Associations, can exploit additional independent computational resources for parallel processing of different associations.

As an example, US20080101357 discloses a method and apparatus for IP network interfacing that provides a possibility to have an arbitrary number of computational resources within an SCTP EP by exploiting a computer network hidden behind a Network Address Translation (NAT). Unfortunately, this method is limited to use of the computational resources hidden behind the NAT. This means that each computational resource has a respective local IP address. Accordingly, each computational resource corresponds to one computer within the hidden computer network, i.e. a network comprising several computers. A problem is hence how to provide a more flexible solution for allowing parallel processing for handling of one or more associations.

SUMMARY

An object may be to improve performance of SCTP in multi-core computer systems of the above mentioned kind.

According to an aspect, the object is achieved by a method, performed by a network node, for handling SCTP packets. The network node manages at least one association towards at least one second network node. The network node provides a control instance of a control procedure for handling administrative chunks of the SCTP packets. Additionally, the network node provides at least one data instance of a data procedure for handling association specific chunks of the SCTP packets. Each of said at least one data instance is configured to handle a respective set of said at least one association. Furthermore, the network node receives, at the control instance and the at least one data instance, an SCTP packet from said at least one second network node. With the control instance, the network node discards association specific chunks of the received SCTP packet.

Additionally, with the control instance, the network node processes administrative chunks of the received SCTP packet. With each of said at least one data instance, said each of said at least one data instance being configured to handle the respective set of said at least one association, the network node discards administrative chunks of the received SCTP packet. Furthermore, with each of said at least one data instance, the network node discards a first set of association specific chunks of the received SCTP packet. The first set of association specific chunks relates any one of said at least one association but the respective set of said at least one association. Moreover, with each of said at least one data instance, the network node processes a second set of association specific chunks of the received SCTP packet. The second set of association specific chunks relates the respective set of said at least one association.

According to another aspect, the object is achieved by a network node configured for handling SCTP packets. The network node manages at least one association towards at least one second network node. The network node is configured for providing a control instance of a control procedure for handling administrative chunks of the SCTP packets. Moreover, the network node is configured for providing at least one data instance of a data procedure for handling association specific chunks of the SCTP packets. Each of said at least one data instance is configured to handle a respective set of said at least one association. The network node is configured for receiving, at the control instance and the at least one data instance, an SCTP packet from said at least one second network node. With the control instance, the network node is configured for discarding association specific chunks of the received SCTP packet.

Additionally, with the control instance, the network node is configured for processing administrative chunks of the received SCTP packet. With each of said at least one data instance, said each of said at least one data instance being configured to handle the respective set of said at least one association, the network node is configured for discarding administrative chunks of the received SCTP packet. Furthermore, with each of said at least one data instance, the network node is configured for discarding a first set of association specific chunks of the received SCTP packet. The first set of association specific chunks relates any one of said at least one association but the respective set of said at least one association. With each of said at least one data instance, the network node is further configured for processing a second set of association specific chunks of the received SCTP packet. The second set of association specific chunks relates the respective set of said at least one association.

According to further aspects, the object is achieved by a computer program and a carrier therefor corresponding to the aspects above.

Thanks to that the network node provides a control instance of a control procedure for handling administrative chunks of the SCTP packets and at least one data instance of a data procedure for handling association specific chunks of the SCTP packets, the network node is able to execute the control instance on one processing core and the data instance on a further processing core. Since said one processing core and the further processing core may execute the control instance and said at least one data instance at least partially simultaneously, i.e. in parallel, capacity for handling SCTP packets is increased. The network node is thus assumed to comprise a multi-core computer system, including said one processing core and said further processing core.

According to some embodiments, the control instance and said at least one data instance is provided for handling the SCTP packets, whereby SCTP packets may be handled using two or more processing cores of the network node. The control instance is responsible for association startup and takedown and path management, while said at least one data instance is mainly responsible for SCTP packets handling. Control of parallel execution of the control instance and one or more of said at least one data instance is left under the control of an Operation System scheduler, being a common part of an Operating System installed on the network node. In this manner, a SCTP capacity, e.g. in terms of bandwidth, is increased and the embodiments herein are scalable in terms of number of SCTP data instances.

An advantage is hence that multiple processing cores of the network node may be exploited for when handling SCTP packets using an implementation of SCTP according to the embodiments herein.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Throughout the following description similar reference numerals have been used to denote similar features, such as nodes, actions, steps, modules, circuits, parts, items elements, units or the like, when applicable. In the Figures, features that appear in some embodiments are indicated by dashed lines.

Figure 4:
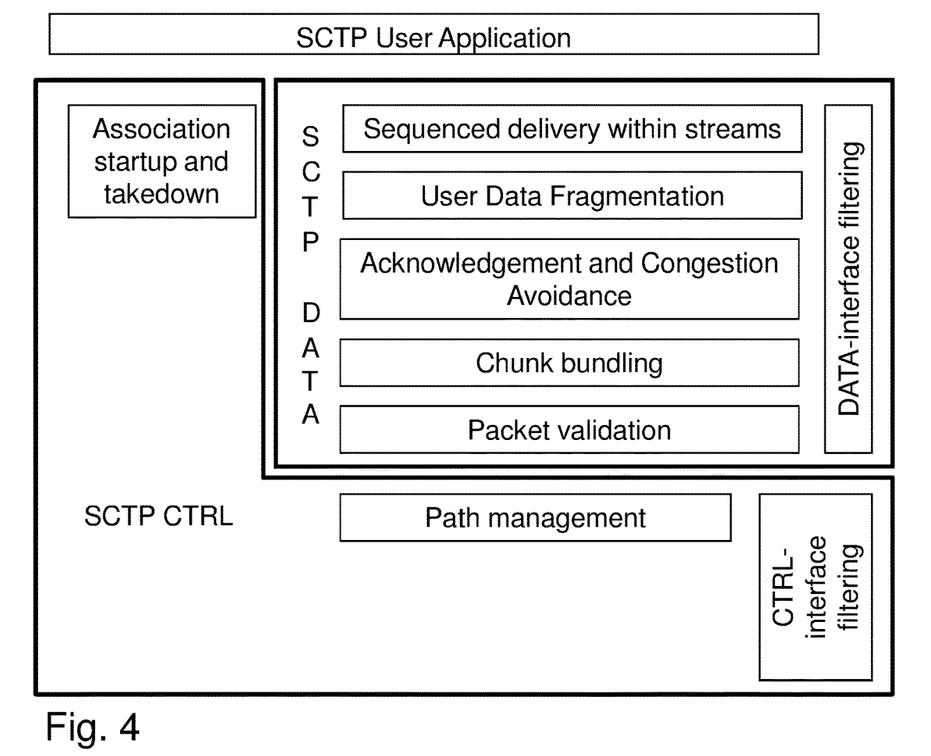
FIG. 4 is a yet other block diagram illustrating an exemplifying SCTP implementation according to embodiments herein.

In contrast to the known single threaded implementation of SCTP according to FIG. 3, FIG. 4 illustrates a control procedure SCTP CTRL and a data procedure SCTP DATA as implemented according to the embodiments herein.

The control procedure includes CTRL-interface chunk selection, which discards any incoming association specific chunks of an SCTP packet. Moreover, the data procedure includes DATA-interface chunk selection, which discards any incoming administrative chunks of the SCTP packet as well as any incoming association specific chunks of the SCTP packet, which chunks do not belong to an observed instance of the data procedure SCTP DATA. Thanks to the interface chunk selection, the control procedure and the data procedure may perform different tasks without being dependent on one another.

Moreover, as seen in FIG. 4, the control procedure SCTP CTRL may include Association start up and takedown as well as Path management, while the data procedure SCTP DATA may include Sequenced delivery within streams, User Data Fragmentation, Acknowledgement and Congestion Avoidance, Chunk bundling, and Packet validation.

Figure 5:
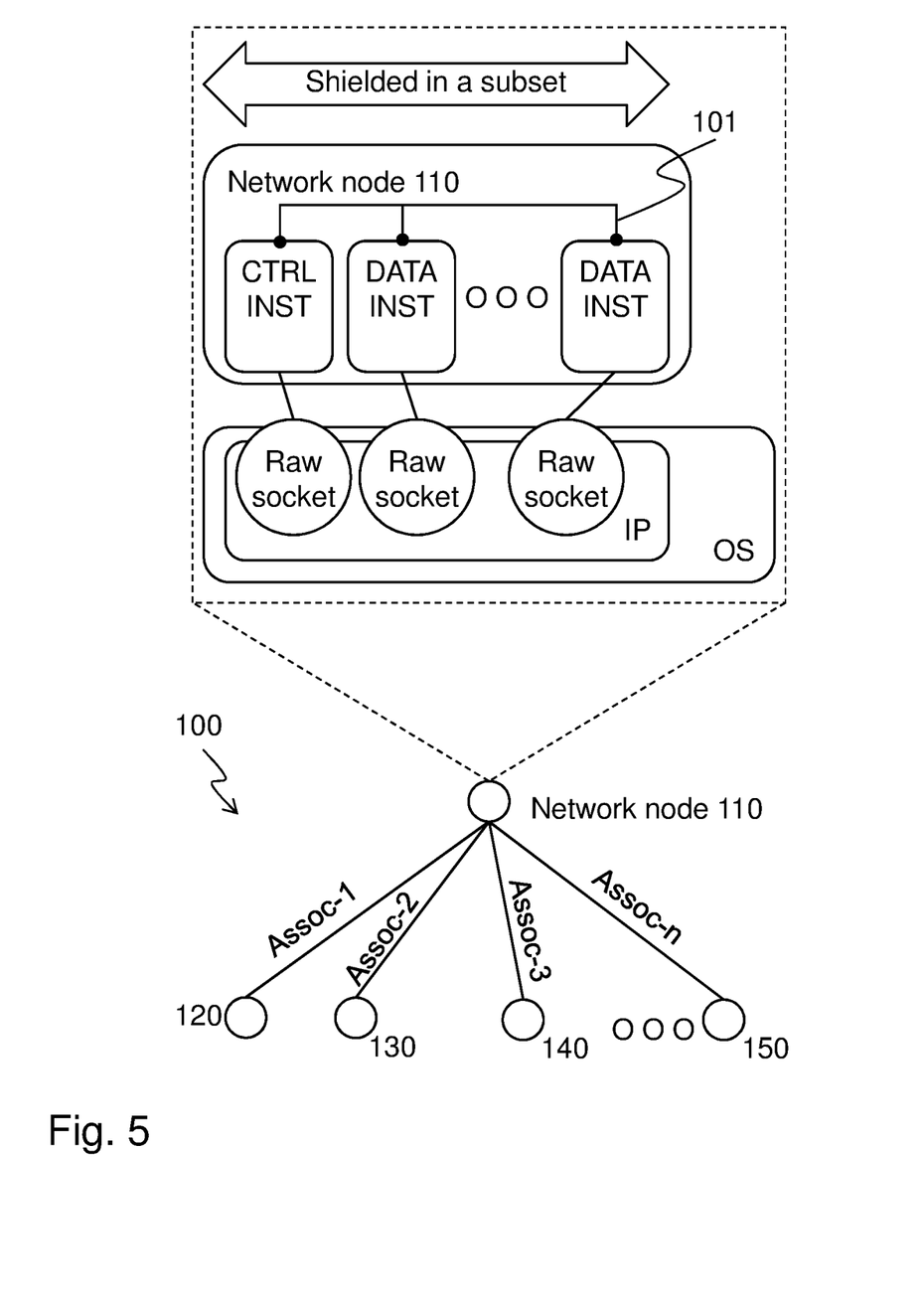
FIG. 5 is an overview illustrating an exemplifying SCTP server according to some embodiments herein.

FIG. 5 depicts an exemplifying system 100 in which embodiments herein may be implemented. The system 100 may be computer system, such as a core network of a telecommunications system. Exemplifying telecommunications systems include e.g. Long Term Evolution (LTE), Universal Mobile Telecommunication System (UMTS) and Worldwide Interoperability for Microwave Access (WiMAX) or the like.

A first end point, such as an SCTP end point, is provided by a network node 110 by execution of a SCTP User Application. The first end point is connected to a number of end points as described in the following. A first association Assoc-1 connects the first end point with a second end point 120. A second association Assoc-2 connects the first end point with a third end point 130. A third association Assoc-3 connects the first end point with a fourth end point 140. Moreover, an n:th association Assoc-n connects the first end point with a n:th end point 140.

FIG. 5 further illustrates that the network node 110 hosts a number of instances as described in more detail with reference to action A010 and A020 below. The instances typically include only one control instance CTRL INST and one or more data instances DATA INST.

As used herein, the term "instance" refers to one copy of a code segment, typically in executable format such as binary code, where the code segment defines one or more procedures. As an example, a procedure is defined in some known programming language. The procedure is then compiled into binary code executable by a processor, having a plurality of processing cores. An operating system is executing on the processor. The operating system may then create multiple instances, i.e. multiple copies, of the binary code, where each copy is executed on a respective processing core. Hence, multiple instances of a procedure are executed on the processor.

As seen in FIG. 5, the control instance CTRL INST knows how many data instances DATA INST are available, i.e. executing on the network node 110. This is possible thanks to an interconnecting interface 101 for communication between the control instance CTRL INST and the data instances DATA INST. Thus, the control instance CTRL INST interacts, such as exchanges first and status information as in actions A070 and A110 below, with the data instances during association start up. The control instance CTRL INST handles the association start up directly and it will spread the associations onto different data instances DATA INST. Once the association is assigned to a particular data instance DATA INST, the particular data instance handles SCTP packets/chunks received directly from the IP layer. One data instance DATA INST may handle one or more specific associations that are not handled by any other data instance DATA INST.

Each instance CTRL INST, DATA INST may connect to an IP layer of an operating system OS, installed in the network node 110. Exemplifying operating systems include Linux, Windows, Mac OS etc. Each instance may connect to the IP layer using raw sockets according to known manner.

In more detail, based on Raw socket all instances CTRL INST, DATA INST receive any and all SCTP packets. What will be handled and what will be discarded depend on the interface chunk selection algorithm, i.e. the actions of discarding and processing as described below, assigned to the instances CTRL INST, DATA INST.

The control and data instances, sometimes referred to as "processes" according to terminology of some operating systems, will run exclusively in a dedicated number of processing cores, e.g. all or a subset of an overall set of available processing cores. In FIG. 5, this is reflected by the text "Shielded in a subset".

The control instance CTRL INST is a bottle-neck concerning handling of SCTP packets. Its effort to discard not interesting SCTP chunks increases with the data traffic that comes from a sum of the data traffic of all associations.

In view of the above, the proposed solution is scalable, but only up to a specific amount, when the effort to discard other-associations packets in the instances CTRL INST, DATA INST impact overall performance. The throughput may thus be described by the following equation:

$$\text{Throughput} = \varphi(n) * \chi * n$$

Where: n is the number of data instances DATA INST
 $\varphi(n)$ is function of number of data instances DATA INST and it is always <1
 $\chi$ is the maximum throughput of a legacy implementation.

Figure 6:
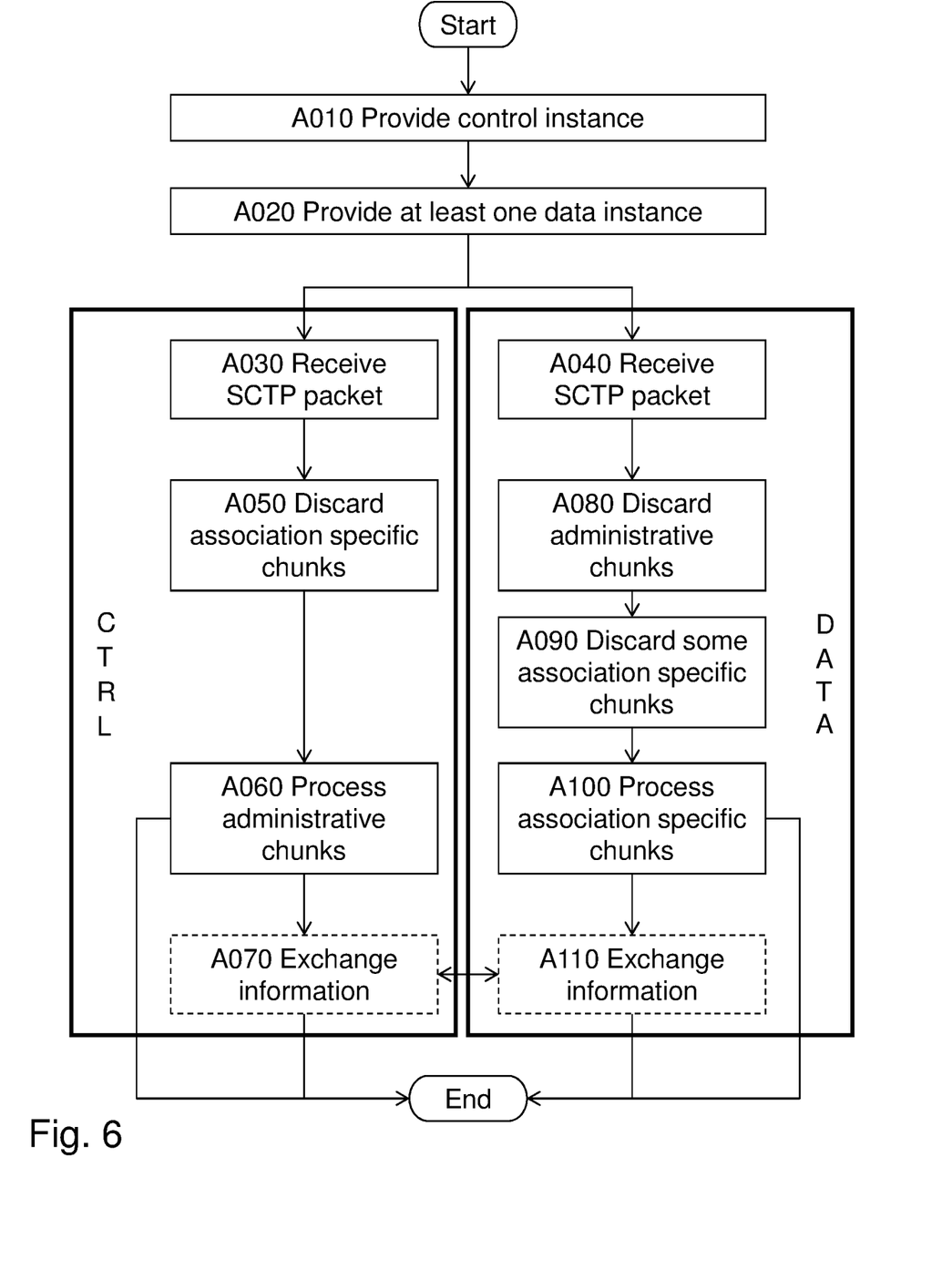
FIG. 6 is a flowchart illustrating embodiments of the method in the network node.

FIG. 6 illustrates an exemplifying method according to embodiments herein when implemented in the system 100 of FIG. 5.

The network node 110 performs a method for handling SCTP packets. The network node 110 manages at least one association towards at least one second network node, such as one of the end points 120, 130, 140, 150 in FIG. 5.

One or more of the following actions may be performed in any suitable order.

Action A010

The network node 110 provides a control instance CTRL of a control procedure for handling administrative chunks of the SCTP packets. The SCTP packet relates to one of said at least one association.

Typically, the providing of the control instance CTRL comprises providing only the control instance CTRL of the control procedure, i.e. only one control instance CTRL exists within the network node 110.

The handling of administrative chunks may comprise association start-up and takedown and path management, which terms are known from standard specification of SCTP.

Action A020

Figure 7:
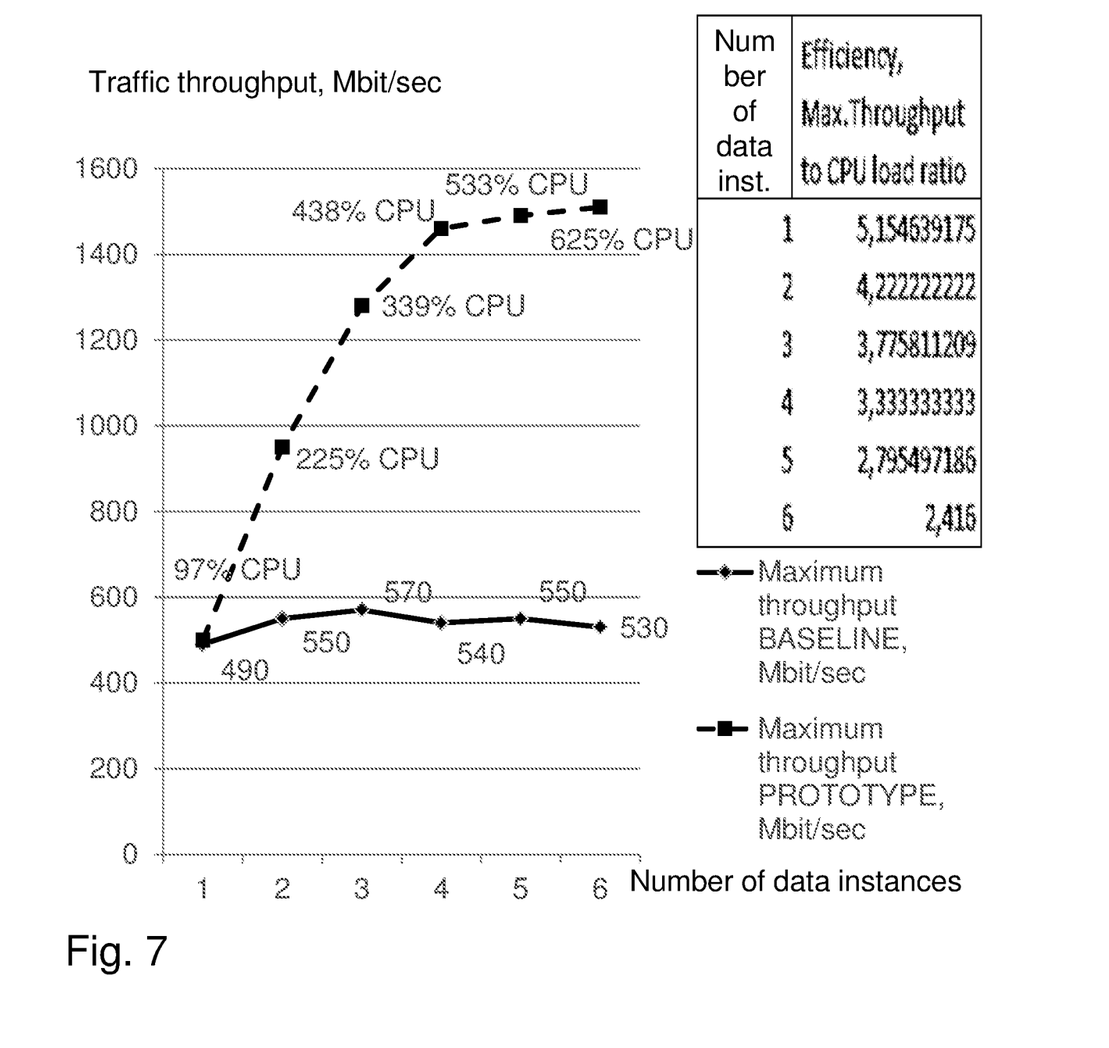
FIG. 7 is a diagram illustrating throughput as a function of number of Front End (FE) servers.

The network node 110 provides at least one data instance DATA of a data procedure for handling association specific chunks of the SCTP packets. Each of said at least one data instance DATA is configured to handle a respective set of said at least one association, The at least one data instance DATA of the data procedure may consist of one, two, three or four data instances DATA of the data procedure. This is illustrated in FIG. 7.

The handling of association specific chunks may comprise sequence delivery within streams, user data fragmentation, acknowledgement and congestion avoidance, chunk bundling and packet validation, which terms are known from standard specification of SCTP.

Each one of the association specific chunks may relate to a respective one of the at least one association.

The control instance CTRL may be executed on a first processing core of the network node 110 and the at least one data instance DATA is executed on at least one second processing core of the network node 110.

Action A030

The network node 110 receives, at the control instance CTRL, an SCTP packet from said at least one second network node 120, 130, 140, 150.

The SCTP packets may be received at the control instance CTRL using respective raw sockets, being setup towards an IP layer of the network node 110.

Action A040

The network node 110 receives, at the at least one data instance DATA, an SCTP packet from said at least one second network node 120, 130, 140, 150. The SCTP packets may be received at the at least one data instance DATA using respective raw sockets, being setup towards an IP layer of the network node 110.

Action A050

The network node 110 discards, with the control instance CTRL, association specific chunks of the received SCTP packet. Said association specific chunks relate to any one of said at least one association.

However, as an example, the network work node 110 counts, with the control instance CTRL, a number of association specific chunks that do not relate to any one of said at least one data instance DATA. Using SCTP-terminology, this refers to counting of out-of-the-blue chunks or out-of-the-blue packets.

Action A060

The network node 110 processes, with the control instance CTRL, administrative chunks of the received SCTP packet. The processing may be performed by the handling of administrative chunks as listed above using SCTP terminology.

Action A070

With the control instance CTRL, the network node 110 may exchange, between the control instance CTRL and said at least one data instance DATA, status information related to SCTP associations. The status information may relate to status of the SCTP associations. The status information comprises one or more of:

information about set up and/or take down of the SCTP associations, information about change of status of the SCTP associations, such as change of number of available IP paths to a peer End Point, and the like.

Action A080

The network node 110 discards, with each of said at least one data instance DATA, administrative chunks of the received SCTP packet.

Action A090

The network node 110 discards, with each of said at least one data instance DATA, a first set of association specific chunks of the received SCTP packet. The first set of association specific chunks relates any one of said at least one association but the respective set of said at least one association.

Action A100

The network node 110 processes, with each of said at least one data instance DATA, a second set of association specific chunks of the received SCTP packet. The processing may be performed by the handling of association specific chunks as listed above using SCTP terminology. The second set of association specific chunks relates the respective set of said at least one association.

The discarding A050 and the processing A060 by the control instance CTRL and the discarding A080, A090 of the administrative chunks of the received SCTP packet and of the first set of association specific chunks of the received SCTP packet and the processing A100 by the at least one data instance DATA may be performed at least partially simultaneously.

Action A110

With each of said at least one data instance DATA, the network node 110 may exchange, between the control instance CTRL and said at least one data instance DATA, the status information related to the received SCTP packet.

An advantage of the proposed embodiments over the existing SCTP implementation is the possibility to exploit multicore architecture of modern CPUs. Hence, allowing the capacity of the SCTP implementation according to the embodiments herein to go beyond computing capacity of a single processing core within SCTP Endpoint.

Given the possibility to use multiple cores for the same SCTP Endpoint allows using cheaper and/or less energy consuming CPUs, with many processing cores operating at lower clock frequency. The embodiments herein permit an even distribution of computational load over any available processing cores, rather having a very powerful CPU that would be underused at some times.

The distribution of SCTP load evenly over the available processing cores enables scalability. With existing solutions, whenever SCTP traffic load becomes too high for a single CPU core, the existing solutions is to either redesign the network in order to exploit more Endpoints, or to replace the CPU with one more powerful one. Implementation of the embodiments herein allows for scaling up of the SCTP capacity. Thus, reducing need for network redesign and for hardware upgrade(s).

Increase in capacity is achieved completely within the SCTP implementation, and is independent from the other protocol layers.

Now turning to FIG. 7, a graph over traffic throughput versus number of data instances PROTOTYPE and a further graph illustrating prior art BASELINE are shown. As the number of data instances increase, the throughput increases up to when the number of data instances is about 5-6. Then, the throughput increase becomes insignificant.

Figure 8:
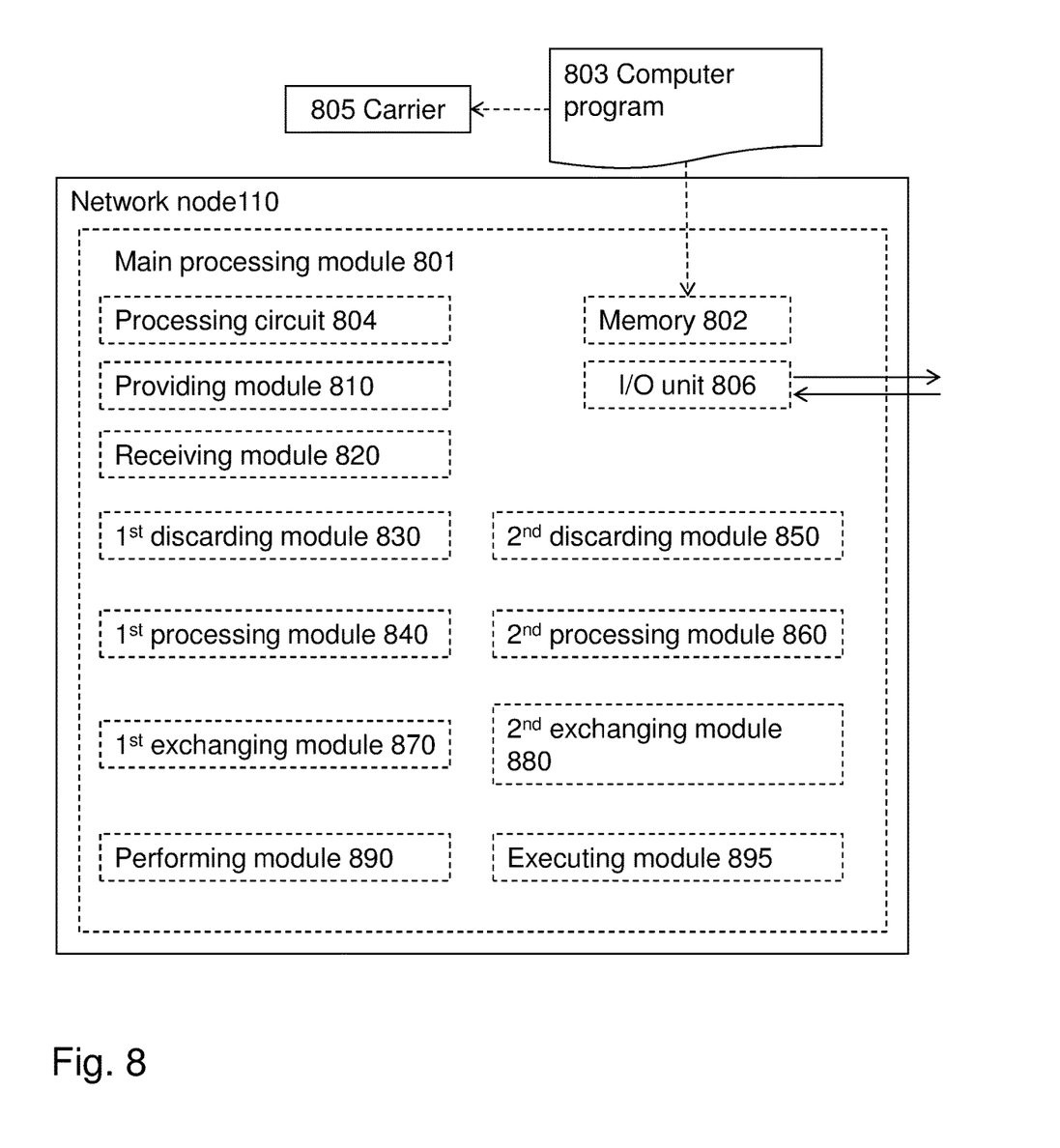
FIG. 8 is a block diagram illustrating embodiments of the network node.

With reference to FIG. 8, a schematic block diagram of embodiments of the network node 110 of FIG. 1 is shown.

The network node 110 may comprise a main processing module 801, such as a means for performing the methods described herein. The means may be embodied in the form of one or more hardware modules and/or one or more software modules The network node 110 may further comprise a memory 802. The memory may comprise, such as contain or store, instructions, e.g. in the form of a computer program 803, which may comprise computer readable code units.

According to some embodiments herein, the network node 110 and/or the main processing module 801 comprises a processing circuit 804 as an exemplifying hardware module. Accordingly, the main processing module 801 may be embodied in the form of, or 'realized by', the processing circuit 804. The instructions may be executable by the processing circuit 804, whereby the network node 110 is operative to perform the methods of FIG. 6. As another example, the instructions, when executed by the network node 110 and/or the processing circuit 804, may cause the network node 110 to perform the methods according to FIG. 6.

FIG. 8 further illustrates a carrier 805, or program carrier, which comprises the computer program 803 as described directly above.

In some embodiments, the main processing module 801 comprises an Input/Output module 806, which may be exemplified by a receiving module and/or a sending module as described below when applicable.

In further embodiments, the network node 110 and/or the main processing module 801 may comprise one or more of a providing module 810, a receiving module 820, a $1^{st}$ discarding module 830, a $1^{st}$ processing module 840, a $2^{nd}$ discarding module 850, a $2^{nd}$ processing module 860, a $1^{st}$ exchanging module 870, a $2^{nd}$ exchanging module 880, a performing module 890 and an executing module 895 as exemplifying hardware modules. In other examples, one or more of the aforementioned exemplifying hardware modules may be implemented as one or more software modules.

The main processing module 801 and/or the processing circuit 804 may comprise the first processing core and said at least one second processing core as mentioned in relation to action A020. In one example, the 1$^{st}$ discarding module 830 and the 1$^{st}$ processing module 840 are executed on the first processing core and the 2$^{nd}$ discarding module 850 and the 2$^{nd}$ processing module 860 are executed on the at least one second processing core.

Accordingly, the network node 110 is configured for handling SCTP packets. The network node 110 manages at least one association towards at least one second network node 120, 130, 140, 150.

Therefore, according to the various embodiments described above, the network node 110 and/or the main processing module 801 and/or the providing module 810 is configured for providing a control instance of a control procedure for handling administrative chunks of the SCTP packets.

Moreover, the network node 110 and/or the main processing module 801 and/or the providing module 810, or another providing module (not shown), is configured for providing at least one data instance of a data procedure for handling association specific chunks of the SCTP packets. Each of said at least one data instance is configured to handle a respective set of said at least one association.

The network node 110 and/or the main processing module 801 and/or the receiving module 820 is configured for receiving, at the control instance and the at least one data instance, an SCTP packet from said at least one second network node 120, 130, 140, 150.

Furthermore, the network node 110 and/or the main processing module 801 and/or the first discarding module 830 is configured for discarding, with the control instance, association specific chunks of the received SCTP packet.

The network node 110 and/or the main processing module 801 and/or the first processing module 840 is configured for processing, with the control instance, administrative chunks of the received SCTP packet.

Said each of said at least one data instance is configured to handle the respective set of said at least one association.

The network node 110 and/or the main processing module 801 and/or the second discarding module 850 is configured for discarding, with each of said at least one data instance, administrative chunks of the received SCTP packet.

Moreover, the network node 110 and/or the main processing module 801 and/or the second discarding module 850, or a further discarding module (not shown), is configured for discarding, with each of said at least one data instance, a first set of association specific chunks of the received SCTP packet. The first set of association specific chunks relates any one of said at least one association but the respective set of said at least one association.

The network node 110 and/or the main processing module 801 and/or the second processing module 860 is configured for processing, with each of said at least one data instance, a second set of association specific chunks of the received SCTP packet. The second set of association specific chunks relates the respective set of said at least one association.

The network node 110 and/or the main processing module 801 and/or the providing module 810 may be configured for providing the control instance by providing only the control instance of the control procedure.

The at least one data instance of the data procedure may consist of one, two, three or four data instances of the data procedure.

The network node 110 and/or the main processing module 801 and/or the receiving module 820 may be configured for receiving the SCTP packets at the control instance and the at least one data instance using respective raw sockets, being setup towards an IP layer of the network node 110.

The network node 110 and/or the main processing module 801 and/or the 1$^{st}$ exchanging module 870 may be configured for, with the control instance, exchanging, between the control instance and said at least one data instance, status information related to SCTP associations.

The network node 110 and/or the main processing module 801 and/or the 2$^{nd}$ exchanging module 880 may be configured for, with each of said at least one data instance, exchanging, between the control instance and said at least one data instance, status information related to the received SCTP packet.

The handling of administrative chunks may comprise association start-up and takedown and path management.

The handling of association specific chunks may comprise sequence delivery within streams, user data fragmentation, acknowledgement and congestion avoidance, chunk bundling and packet validation.

Each one of the association specific chunks may relate to a respective one of the at least one association.

The network node 110 and/or the main processing module 801 and/or the performing module 890 may be configured for performing the discarding and the processing by the control instance and the discarding of the administrative chunks and the first set of association specific chunks of the received SCTP packet and the processing by the at least one data instance may be performed at least partially simultaneously.

The network node 110 and/or the main processing module 801 and/or the executing module 895 may be configured for executing the control instance on a first processing core of the network node 110 and the at least one data instance is executed on at least one second processing core of the network node 110.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "program carrier", or "carrier", may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a network node, for handling stream control transport protocol (SCTP) packets, wherein the network node manages at least one association towards at least one second network node, wherein the network node separates a control procedure from a data procedure for partially simultaneous processig of the SCTP packets arriving at the network node, the method comprises:
   providing a control instance of a control procedure for handling administrative chunks of the SCTP packets;
   providing a plurality of data instances for the data procedure for handling association specific chunks of the SCTP packets, wherein each of the data instances is configured to handle a respective set of the association specific chunks;
   receiving, at the control instance and at the plurality of data instances, an SCTP packet from the at least one second network node;
   in response to receiving the SCTP packet, discarding association specific chunks of the received SCTP packet and keeping administrative chunks of the received SCTP packet for the control instance, wherein the control instance processes the administrative chunks in a first processing core to provide controls for the plurality of data instances to handle the association specific chunks;
   in response to receiving the SCTP packet, discarding the administrative chunks of the received SCTP packet for the plurality of the data instances;
   for each data instance of the plurality of data instances, discarding association specific chunks of the received SCTP packet not related to the respective set of the association specific chunks; and
   keeping and processing, by each data instance, a set of association specific chunks not discarded by each respective data instance, wherein the data instances are executed in at least on second processing core separate from the first processing core.

2. The method according to claim 1, wherein the providing of the control instance comprises providing only one control instance for the control procedure.

3. The method according to claim 1, wherein the plurality of data instances comprises two, three or four data instances for the data procedure.

4. The method according to claim 1, wherein the SCTP packets are received at the control instance and the data instance uses respective raw sockets, being setup towards an Internet Protocol (IP) layer of the network node.

5. The method according to claim 1, further comprising: exchanging, between the control instance and the plurality of data instances, status information related to SCTP associations.

6. The method according to claim 1, wherein the handling of administrative chunks comprises association start-up and takedown and path management.

7. The method according to claim 1, wherein the handling of association specific chunks comprises sequence delivery within streams, user data fragmentation, acknowledgement and congestion avoidance, chunk bundling and packet validation.

8. The method according to claim 1, wherein the discarding the association specific chunks and the administrative chunks are performed at least partially simultaneously.

9. A network node configured for handling stream control transport protocol (SCTP) packets, wherein the network node manages at least one association towards at least one second network node, wherein the network node separates a control procedure from a data procedure for partially simultaneous processing of the SCTP packets arriving at the network node, the network configured to:
provide a control instance for the control procedure for handling administrative chunks of the SCTP packets;
provide a plurality of data instances for the data procedure for handling association specific chunks of the SCTP packets, wherein each of the data instances is configured to handle a respective set of the association specific chunks;
receive, at the control instance and at the plurality of data instances, an SCTP packet from the at least one second network node;
in response to receipt of the SCTP packet, discard association specific chunks of the received SCTP packet and keep administrative chunks of the received SCTP packet for the control instance, wherein the control instance to process the administrative chunks in a first processing core to provide controls for the plurality of data instances to handle the association specific chunks;
in response to receipt of the SCTP packet, discard the administrative chunks of the received SCTP packet for the plurality of the data instances;
for each data instance of the plurality of data instances, discard association specific chunks of the received SCTP packet not related to the respective set of the association specifc chunks; and
keep and process, by each data instance, a set of association specific chunks not discarded by each respective data instance, wherein the data instances are executed in at least one second processing core separate from the first processing core.

10. The network node according to claim 9, wherein the network node is configured to provide only one control instance for the control procedure.

11. The network node according to claim 9, wherein the plurality of data instances comprises two, three or four data instances for the data procedure.

12. The network node according to claim 9, wherein the network node is configured to receive the SCTP packets at the control instance and the data instance to use respective raw sockets, being setup towards an Internet Protocol (IP) layer of the network node.

13. The network node according to claim 9, wherein the network node is configured further to:
exchange, between the control instance and the plurality of data instances, status information related to SCTP associations.

14. The network node according to claim 9, wherein the handling of administrative chunks comprises association start-up and takedown and path management.

15. The network node according to claim 9, wherein the handling of association specific chunks comprises sequence delivery within streams, user data fragmentation, acknowledgement and congestion avoidance, chunk bundling and packet validation.

16. The network node according to claim 9, wherein the network node is configured to discard the association specific chunks and to discard the administrative chunks at least partially simultaneously.

17. A non-transitory computer readable storage medium containing computer program comprising computer readable code units which, when executed on a processor of a network node that separates a control procedure from a data procedure for partially simultaneous processing of Currently Amended (SCTP) packets arriving at the network node, cause the network node to perform operations comprising:
provide a control instance for the control procedure for handling administrative chunks of SCTP packets;
provide a plurality of data instances for the data procedure for handling association specific chunks of the SCTP packets, wherein each of the data instances is configured to handle a respective set of the association specific chunks;
receive, at the control instance and at the plurality of data instances, an SCTP packet from at least one second network node;
in response to receiving the SCTP packet, discarding association specific chunks of the received SCTP packet and keeping administrative chunks of the received SCTP packet for the control instance, wherein the control instance processes the administrative chunks in a first processing core to provide controls for the plurality of data instances to handle the association specific chunks;
in response to receiving the SCTP packet, discarding the administrative chunks of the received SCTP packet for the plurality of the data instances;
for each data instance of the plurality of data instances, discarding association specific chunks of the received SCTP packet not related to the respective set of the association specific chunks; and
keeping and processing, by each data instance, a set of association specific chunks not discarded by each respective data instance, wherein the data instances are executed in at least one second processing core separate from the first processing core.

18. The non-transitory computer readable storage medium according to claim 17 wherein the computer readable code units further cause the network node to perform operations to:
exchange, between the control instance and the plurality of data instances, status information related to SCTP associations.

* * * * *